United States Patent [19]
Brown

[11] 4,344,007
[45] Aug. 10, 1982

[54] DIRECT CURRENT MOTOR AND GENERATOR

[76] Inventor: Dallas B. Brown, 1416 Pratt Ave., Huntsville, Ala. 35801

[21] Appl. No.: 163,864

[22] Filed: Jun. 27, 1980

Related U.S. Application Data

[63] Continuation-in-part of Ser. No. 926,894, Jul. 21, 1978, abandoned.

[51] Int. Cl.³ .............................................. H02K 37/00
[52] U.S. Cl. ....................................................... 310/46
[58] Field of Search ......................................... 310/46

[56] References Cited

U.S. PATENT DOCUMENTS 2,408,375  10/1946  Collins .................................. 310/46
4,213,069   7/1980  Pryor .................................... 310/46

*Primary Examiner*—Donovan F. Duggan
*Attorney, Agent, or Firm*—C. A. Phillips

[57] ABSTRACT

A direct current motor, or generator, wherein there are pairs of diametrically oppositely positioned armature coils connected together, and wherein one pair is solely connected to a single set of diametrically opposite commutator segments.

1 Claim, 2 Drawing Figures

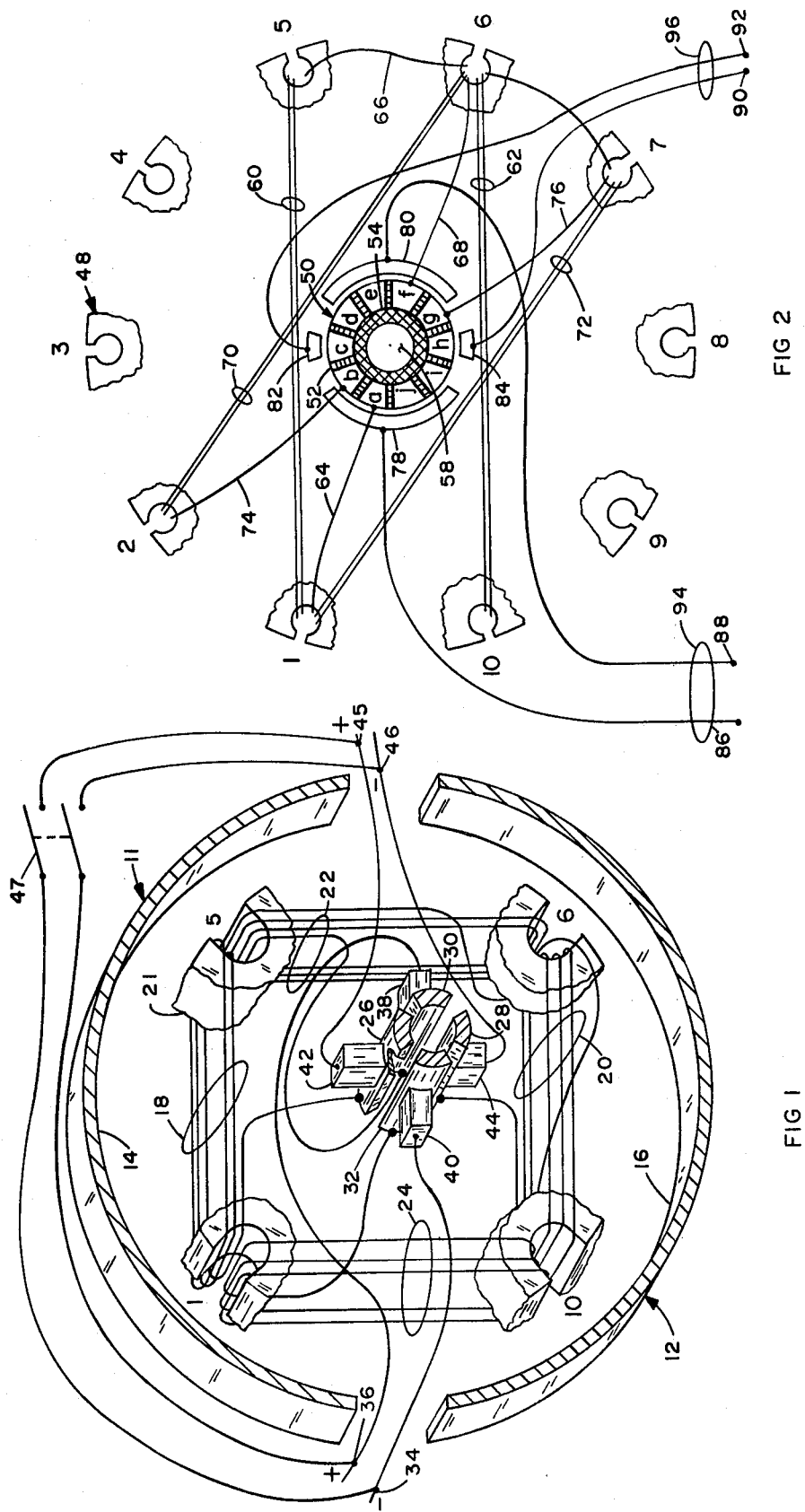

4,344,007

DIRECT CURRENT MOTOR AND GENERATOR

This application is a continuation-in-part of patent application Ser. No. 926,894, filed July 21, 1978, now abandoned entitled, "Connections For Motors and Generators".

TECHNICAL FIELD

This invention relates to direct current motors and generators, and particularly to an improved system of interconnection between armature coils and commutator segments.

BACKGROUND ART

There are two basic systems of winding direct current motors and generators--one commonly referred to as a lap winding, and the other referred to as a wave winding. In both instances, all coils of the winding are interconnected. The applicant has determined that improved characteristics, both as to speed and efficiency, can be achieved by a new method of winding.

DISCLOSURE OF THE INVENTION

In accordance with this invention, single sets or pairs of windings are electrically interconnected, and each set is connected to a single set of oppositely positioned commutator segments. The two windings of a pair are positioned parallel, they being on opposite sides of the axis of the device. The segments they connect to generally lie along a line which forms a diagonal between the two windings of the pair of windings. While a minimum number of two pairs of windings are employed, they may, and usually would be, a larger number of pairs, the number of pairs being an even number and the commutator segments being an even number. Significantly, only one pair of coils is connected to a pair of commutator segments.

BRIEF DESCRIPTION OF THE DRAWINGS

FIG. 1 is a schematic illustration illustrating the basic system of the invention.

FIG. 2 is a schematic illustration showing the system of winding of a motor, or generator, in accordance with this invention.

BEST MODE FOR CARRYING OUT THE INVENTION

Referring to FIG. 1, there is shown a two-pole direct current motor 11 having a stationary permanent magnet field magnet 12, having a north pole 14 and a south pole 16. A first pair of armature coils 18 and 20 are positioned diametrically opposite on an armature 21, coil 18 being wound through slots 1 and 5, and coil 20 being wound through slots 6 and 10. Additionally, there is provided a second pair of diametrically opposite armature coils 22 and 24, shifted circumferentially by 90° with respect to the first pair, and thus there being a coil each 90° around the armature, coil 22 being wound through slots 5 and 6, and coil 24 being wound through slots 1 and 10. As will be noted, coils 18 and 20 are connected in series between a pair of diametrically oppositely positioned commutator segments 26 and 28, and coils 22 and 24 are similarly connected between commutator segments 30 and 32. The direction of winding of the coils (e.g., parallel coils clockwise) and the polarity of electrical input to them is such as to produce a field to react with field magnet 12 to produce rotation of armature 21.

Power is applied to motor 11 through input power terminals 34 and 36, which connect to diametrically oppositely positioned brushes 38 and 40.

As an additional feature of this invention, a second set of brushes 42 and 44 are provided, which pick off a generated voltage of the polarity of a counter electromotive force voltage, and this voltage is connected to terminals 45 and 46. Brushes 42 and 44 are circumferentially positioned between brushes 38 and 40. In addition to the provision of an output voltage, either or both of terminals 34 and 36 may be coupled to the unlike polarized input power terminals 45 and 46. In this case, increased torque and efficiency is achieved. It appears this arises by virtue of the elimination of a problem which typically persists with existing winding techniques. This is in reference to the fact that commutation normally occurs (a reversal of polarity drive to the armature coils) at 15° rotation of an armature beyond the angular coincidence of the armature and field magnetic fields. Thus, for this 15° increment, the magnetization of the armature actually opposes rotation. With the present invention, the interconnections are such that with the two sets of brushes interconnected in an unlike polarity arrangement as described, commutation occurs approximately at the point of magnetic alignment of the axes of the armature and field magnetic fields, and thus the difficulty of the 15° lag in commutation is eliminated. The selection of this mode of operation is illustrated by switch 47, by which the interconnection of the brushes is facilitated.

FIG. 2 illustrates in greater detail the winding system contemplated by the present invention, illustrating it with respect to an armature frame 48 having 10 armature slots, labelled 1–10. The slots are angularly positioned about armature frame 48 at equal angles of 36°. Commutator 50 has a like number of commutator segments, these being labelled A–J, and likewise centered in 36° increments around commutator 50. They are conventionally insulated by insulating strips 52 and by insulating region 54, which mounts commutator 50 on shaft 58. Commutator 50 and armature frame 48 are both rigidly mounted on armature shaft 58. A first coil 60 of a pair of coils 60 and 62 is wound generally in a plane through armature slots 1 and 5. One lead 64 from this coil connects to commutator segment A, and the other lead 66 is connected to and forms one end of coil 62, which coil is wound between armature slots 6 and 10. The remaining end of coil 62 is then connected via lead 68 to commutator segment F. Commutator segments A and F lie along a line diametrically through the center of shaft 58, which intersects the planes of coils 60 and 62 at equal angles. The coils would have a selected number of turns, e.g., 15 (only two are shown), depending upon the size of the motor.

To fully cover in symmetrical fashion the winding requirements for a 36° pitch with respect to windings, the next pair of windings, consisting of coils 70 and 72, is wound as shown, wherein coil 70 is wound through slots 2 and 6, and coil 72 is wound through slots 1 and 7. The coils are connected together in series, with their otherwise free ends connected through leads 74 and 76 between armature segments B and G in the same relative orientation to the coils as described above.

The system of winding continues with a third pair of coils having a first coil wound through frame slots 3 and 7 and a second coil wound through slots 2 and 8; followed by a fourth coil pair having a first coil wound through armature slots 4 and 8 and a second coil wound through slots 3 and 9; and finally, a fifth coil pair having a first coil wound through armature slots 5 and 9 and a second coil wound through armature slots 4 and 10. In keeping with the pattern described, the free ends of the third pair of coils would be connected between armature segments C and H, the free ends of the fourth pair of coils connected between armature segments D and I, and the free ends of the fifth pair of coils connected between armature segments E and J. As the pattern of winding is repeated as described, the third through the fifth sets of windings have not been shown in the drawing as a matter of clarity of illustration.

The brush arrangement of the device of FIG. 2 is illustrated as including diametrically oppositely positioned brushes 78 and 80, each dimensioned to engage four adjoining commutator segments. Additionally, diametrically opposite smaller brushes 82 and 84 are provided and are dimensioned to be of a dimension slightly narrower than the width of a single commutator segment. Brushes 78 and 80 are input brushes adapted to be connected to a power input (when to be used as a motor, or output terminals when to be used as a generator) through terminals 86 and 88, and small brushes 82 and 84 are shown as being connected to a pair of terminals 90 and 92. Terminals 90 and 92 may be used to provide an output voltage, or one or both of them may be connected to unlike polarity terminals 86 and 88 to provide enhanced operation of the device as a motor or generator.

While the device thus far has generally been described as employed as a motor, it is to be appreciated that it may be operated as a generator. In such case, by simply driving shaft 58, an output voltage can be obtained across either or both sets of brush terminals 94 and 96. Alternately, they may be connected together as described.

I claim:
1. A direct current device comprising:
   at least one pair of oppositely positioned, stationary, magnetic field poles;
   a rotatable circular armature frame and an even number of at least four equal angularly spaced winding slots positioned about said frame;
   a circular commutator rigidly connected to said armature frame, and having a like number of insulated commutator segments equally angularly oriented around said commutator;
   at least two pairs of coils of first and second coils to the pair;
   the first and second coils of a pair being positioned generally in parallel planes, lying on opposite sides of the center line of said commutator and armature frame, and each coil being wound through a pair of said slots, the coils of a said pair being electrically connected together and to a pair of commutator segments lying diametrically on opposite sides of of said commutator, said last-named segment lying along a line which intersects said planes at approximately equal angles;
   a first pair of diametrically opposed brushes adapted to make sliding contacts with at least one commutator segment per brush, and means for applying a source of direct current potential between said brushes; and
   a second set of diametrically opposed brushes positioned angularly between said first-named brushes and adapted to make sliding contacts with at least one commutator segment per brush, and means for obtaining an output potential from across said second set of brushes.

* * * * *